United States Patent [19]

Hexel

[11] Patent Number: 5,080,853
[45] Date of Patent: Jan. 14, 1992

[54] PROCESS FOR DEEP DRAWING PLASTIC FOILS

[75] Inventor: Günter Hexel, Brunswick, Fed. Rep. of Germany

[73] Assignee: Schmalbach-Lubeca AG, Brunswick, Fed. Rep. of Germany

[21] Appl. No.: 576,616

[22] Filed: Aug. 31, 1990

[30] Foreign Application Priority Data

Sep. 7, 1989 [DE] Fed. Rep. of Germany ....... 3929826

[51] Int. Cl.$^5$ .............................................. B29B 51/08
[52] U.S. Cl. .................................... 264/292; 425/398
[58] Field of Search ............... 264/292, 549, 550, 551; 425/398, 400

[56] References Cited

U.S. PATENT DOCUMENTS 3,943,215  3/1976  Grüne et al. ......................... 264/512
3,956,451  5/1976  Adams ................................. 264/338
3,975,493  8/1976  Tigner et al. ........................ 264/292
4,480,979  11/1984  Keith et al. .......................... 264/292

FOREIGN PATENT DOCUMENTS 6682      1/1980  European Pat. Off. ............ 264/292
54-66962  5/1979  Japan .................................. 264/549
5073512   6/1980  Japan .................................. 264/292
860810    2/1961  United Kingdom .

Primary Examiner—Jan H. Silbaugh
Assistant Examiner—Brian J. Eastley
Attorney, Agent, or Firm—Herbert Dubno

[57] ABSTRACT

The deep-drawing of plastic foils for producing receptacles uses a drawing punch intermittently movable into a drawing mold and several expansion elements (jaws) radially movable on the drawing punch. The movement of the jaws and the punch is mutually effected to discontinuously move the drawing punch during its inward movement and to stop it for a respective predetermined dwell time. This can be combined with a continuous or discontinuous movement of the expansion jaw elements.

5 Claims, 1 Drawing Sheet 5,080,853

PROCESS FOR DEEP DRAWING PLASTIC FOILS

FIELD OF THE INVENTION

The invention relates to a process for deep-drawing plastic foils for producing hollow articles in a drawing mold by a drawing punch discontinuously moved upon its axial inward movements into the mold.

Deep drawing processes are known, e.g. from United Kingdom Patent 860 810 or the European Open Application 0 006 682. These processes serve for producing hollow articles such as receptacles or the like from a planar plastic foil by means of a drawing mold and a drawing punch which is designed to be radially expandable by means of the expansion jaws. For this purpose, the foil is clamped across the opening of the drawing mold and shaped by means of the drawing punch by the expansion jaws having axial and radial movements. The axial and radial movements of the drawing punch and expansion jaws are substantially continuous. The system is so designed that the expansion movement of the expansion jaws begins only after the axial inward movement of the drawing punch and can stop before the completion of the inward movement (cf. said European OS). The inward movement of the drawing punch and the movement of the expansion jaws are both effected continuously in the phase of the outward movement of the jaws.

Single foils and compound foils which consist of several different layers can be processed with such processes.

It has become apparent in practice that the deep-drawn hollow bodies or receptacles may have irregularities regarding the wall thickness. This means that if one wants to avoid a failure of the article as a result of too thin a wall, one must start from larger starting thicknesses of the foil material as a matter of precaution in order to be able to ensure the requisite mechanical and physical properties of the article or the packages produced therefrom. The uncertainties set forth impair the reliability in mass production, while the use of starting foils dimensioned thicker as a matter of precaution increase the costs of the mass-produced articles.

OBJECTS OF THE INVENTION

It is therefore the object of the invention to provide an improved deep-drawing process eliminating the problems inherent in the known processes in a simple and cost-efficient fashion.

These objects are attained in a process for the deep-drawing of plastic foils for the purpose of producing hollow articles by means of a drawing mold, a drawing punch being axially movable with respect to the mold and a plurality of expansion jaw elements engaging the plastic foil and mounted on the drawing punch in a fashion so that they can be extended and swung out in radial direction, and which are moved radially outwardly in predetermined dependence on the axial inward movement of the drawing punch into the drawing mold. According to the invention the drawing punch is discontinuously moved upon its axial inward movement into the drawing mold.

SUMMARY OF THE INVENTION

I have found that deep-drawn hollow articles, in particular receptacles, can be produced by the discontinuous movement of the drawing punch, in particular if the movement of the drawing punch is carried out in several discrete steps and the drawing punch is stopped after each step for a predetermined dwell time. A substantially greater uniformity of the wall thickness can be observed and it is thus ensured that there is the predetermined minimum thickness in all areas of the article during the deep-drawing process. As a result the foil thickness in the application of the new deep-drawing process need not be greater than necessary for reasons of safety.

As a consequence, the process beings a considerable economy of saving a substantial amount of material.

A different thickness of walls in the known deep-drawing processes is caused by the fact that the plastic material of the foil cannot often be replenished quickly enough during the movements of drawing punch and expansion jaw elements resulting in too small a wall thickness of the receptacle at some places. The flow of material within the foil is substantially promoted and improved by the measures according to the invention, whereby the better and more uniform wall thickness distribution can be achieved.

The new process can be carried out in different ways. Independently of the discontinuous or stepwise movement of the drawing punch the movement of the expansion jaw elements can be carried out continuously and uniformly across its entire respective movement range. However, it may also be advantageous to move the expansion jaw elements in predetermined fashion discontinuously or stepwise across their entire movement range and to allocate a specific dwell time to the expansion jaw elements after each step.

A further feature of the process the selection of the time allocation of the discontinuous movements of drawing punch and expansion jaw elements in the case of discontinuous movement of drawing punch and expansion jaw elements.

The movements of drawing punch and expansion jaw elements can be substantially synchronized so that both are stopped in their movements at the same time. However, it is also possible to shift the movement cadence of drawing punch and expansion jaw elements with respect to each other or to carry out the movement of the one element during the dwell time of the other one. It is also possible to carry out the movement of the expansion jaw elements continuously or discontinuously in several small steps during the dwell time of the drawing punch.

The dwell time and its distribution depends on the type of the foil material and on the type and the extent of the deep drawing process.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
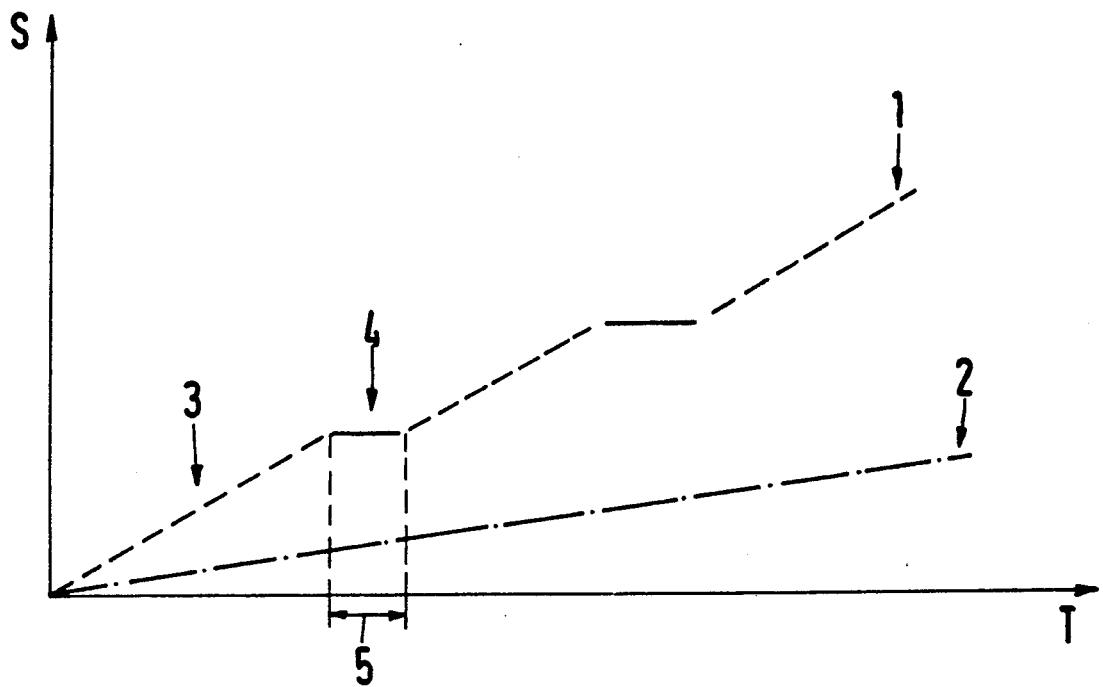
FIG. 1 is a diagram showing a continuous expansion of the jaws and a stepwise movement of the punch as a function of time.

The paths of the drawing punch, on the one hand, and of the expansion jaw element, on the other hand, is represented in both FIGS. as a function of time T.

In the embodiment shown in FIG. 1, the dashed curve 1 represents the path of the drawing punch and the dash-dotted curve 2 the path of the expansion jaw elements. While the expansion of the jaw elements is a uniform continuous movement during the deep-drawing process, the movement of the drawing punch is carried out stepwise. The movement of the latter interrupted as indicated by 4 after a phase 3 of the continuous inward movement and the drawing punch is stopped for a predetermined period of time 5.

Figure 2:
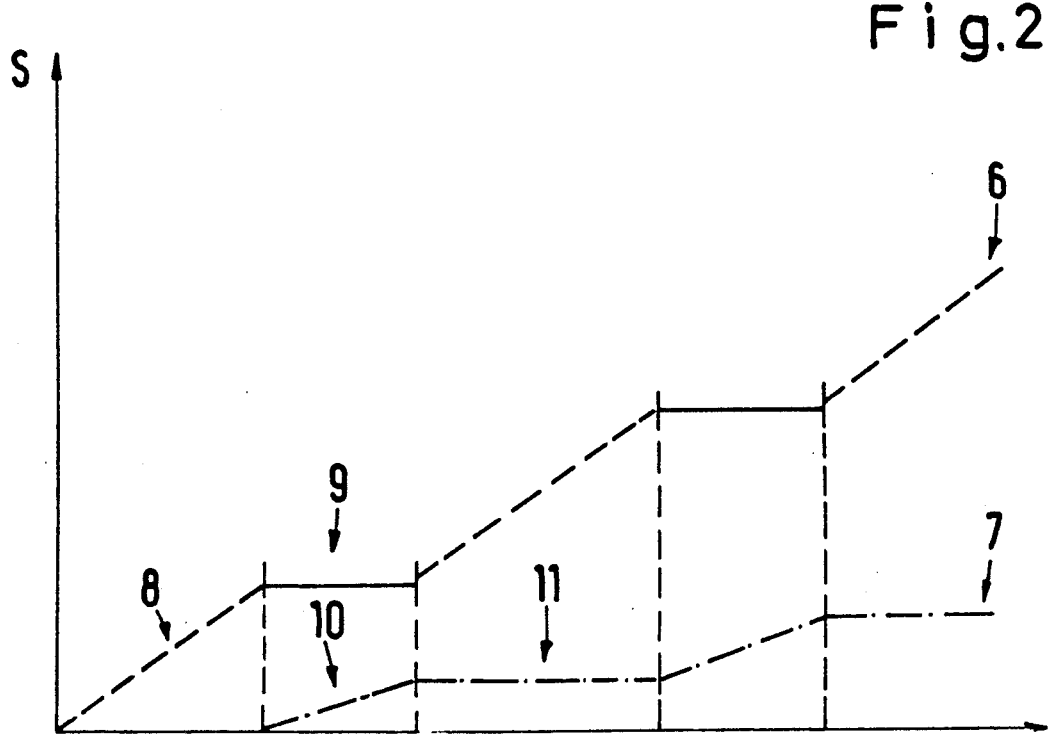
FIG. 2 is a diagram illustrating a stepwise movement of both jaw elements and punch as a function of time according to the present invention.

In the example illustrated in FIG. 2 a time period of each of the continuous inward movement 8 of the drawing punch (see curve 6) is connected with a dwell time 11 of the expansion jaw elements (see curve 7). On the other side a phase 10 of continuous movement of the expansion jaw elements is allocated to a dwell time 9 of the drawing punch.

The curves 6 and 7 of FIG. 2 may also be shifted (offset) with respect to each other along the time axis.

I claim:

1. A process for deep drawing a plastic foil, comprising the steps of:
   (a) stretching a plastic foil across an opening of a deep drawing mold;
   (b) advancing a deep drawing punch axially into said mold so that said punch entrains said foil into said mold progressively more deeply in a plurality of steps from a beginning of drawing to an end of drawing;
   (c) halting advance of said deep drawing punch between successive steps for each of a plurality of successive dwell periods; and
   (d) radially expanding expansion jaws on said deep drawing punch at least during the successive dwell periods of said deep drawing punch to expand said foil.

2. The process defined in claim 1 wherein said expansion jaws are moved radially outwardly continuously from said beginning to said end of drawing.

3. The process defined in claim 1 wherein said jaws are moved discontinuously outwardly from said beginning to said end of drawings.

4. The process defined in claim 3 wherein said jaws are moved radially outwardly only during said dwell periods.

5. The process defined in claim 3 wherein said jaws are moved radially outwardly in discrete steps and stepwise movements of said punch and said jaws are synchronized with one another.

* * * * *